No. 753,537. Patented March 1, 1904.

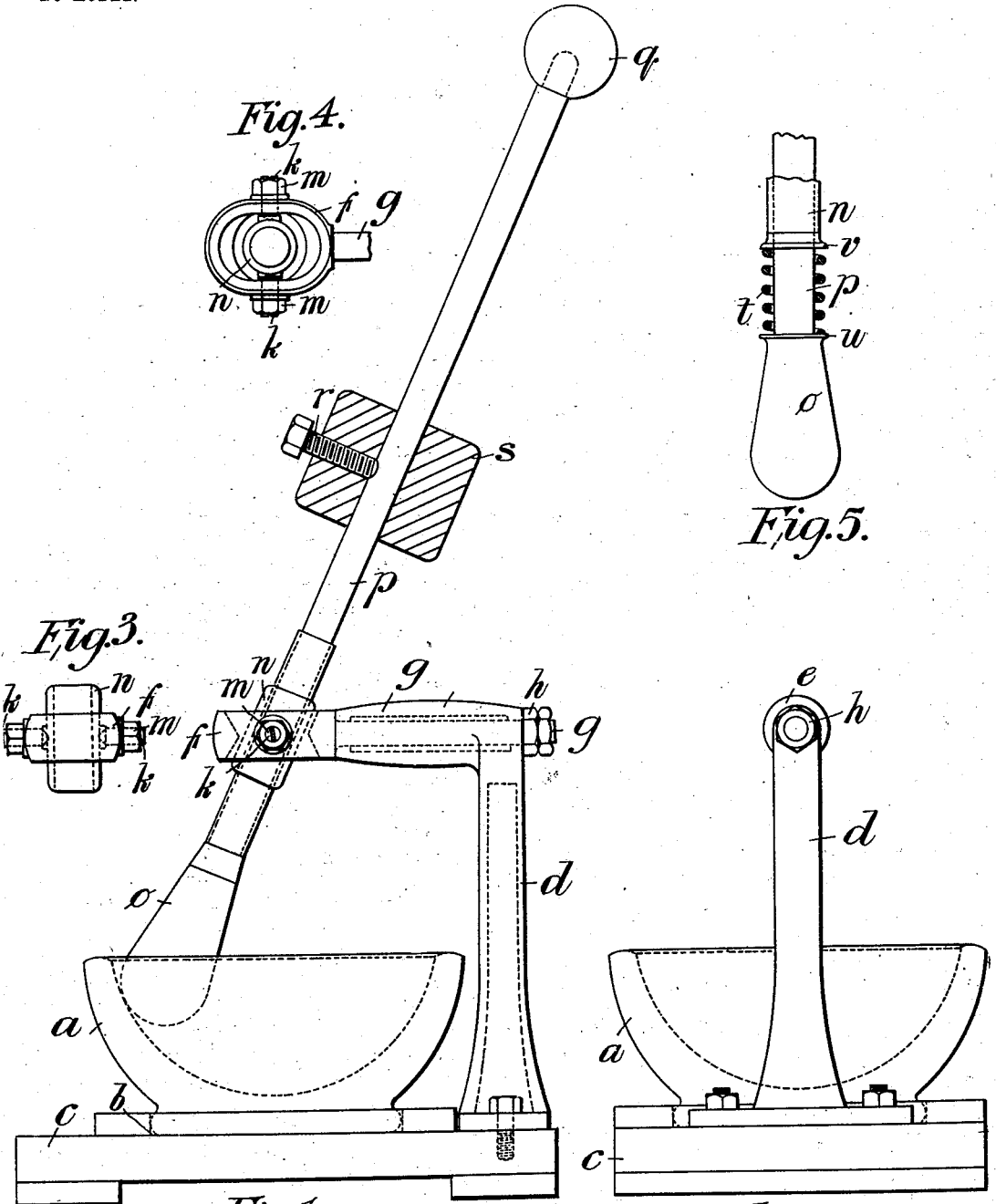

UNITED STATES PATENT OFFICE.

THOMAS BREAKELL, OF WIRKSWORTH, NEAR DERBY, ENGLAND.

APPARATUS FOR GRINDING OR CRUSHING.

SPECIFICATION forming part of Letters Patent No. 753,537, dated March 1, 1904.

Application filed March 25, 1903. Serial No. 149,581. (No model.)

*To all whom it may concern:*

Be it known that I, THOMAS BREAKELL, a subject of the King of Great Britain and Ireland, and a resident of Brassington Hall, Wirksworth, near Derby, England, have invented certain new and useful Improvements in Apparatus for Grinding or Crushing, of which the following is a specification.

My invention relates to apparatus for grinding and crushing; and it consists in a combination of parts, which will be described in the specification and more particularly set forth in the claims.

Referring now to the accompanying drawings, which illustrate my invention, Figure 1 shows in side elevation a pestle and mortar constructed and arranged according to one convenient form of my invention. Fig. 2 is a back view of the same, the pestle and its supporting-block being removed. Fig. 3 is a front elevation of the pestle guiding-sleeve and support. Fig. 4 is a plan of the pestle guiding-sleeve and support. Fig. 5 shows an arrangement of spring for pressing down the pestle.

$a$ is the mortar, which rests in the recess $b$, provided in the base-block $c$, which may be made of wood, iron, or other suitable material. To this base-block is fastened a column $d$, having at its upper end a horizontal arm or bracket $e$. A support $f$ is provided with a spindle extension-piece $g$, which passes through a hole in the arm $e$, is screw-threaded at its end, and is secured by nuts $h$ in such a way that the support can rotate about the axis of the spindle, but is prevented from moving parallel to the axis of the spindle. The block $f$ is tapped to receive studs $k\,k$, which are screwed into it opposite each other, as shown in Figs. 1, 3, and 4, and are locked in place by nuts $m\,m$. The inner ends of these studs are adapted to work in holes cut in the sleeve $n$, so that this sleeve can oscillate about the axes of these studs.

The pestle $o$ is provided with a long stem $p$, which stem may be made of wood, iron, or other suitable material, but if made of wood should have a covering of brass or other metal at the part where it passes through the sleeve $n$. The stem is capable of rotating in this sleeve $n$ and also of moving axially within it. A handle $q$ of any convenient shape is provided at the end of the stem $p$ and is preferably arranged so that the stem can rotate without the handle. The handle may simply be slipped onto the end of the stem, or I may secure it, if desired, by a washer and nut in any usual or convenient manner.

I may provide a weight $s$ on the stem $p$, and I may secure this in place by means of a set-pin $r$ or other convenient means. I preferably arrange that this weight $s$ can be adjusted on the stem $p$. Instead of employing a weight or in addition thereto I may provide a spring $t$, as shown in Fig. 5. This spring presses downward on a shoulder $u$ on the pestle and presses upward against a collar $v$, which presses against but can rotate relatively to the sleeve $n$.

The material to be ground, crushed, or powdered is placed in the mortar, and the handle of the pestle is then given a rotary motion about the axis of the mortar, so that the acting end of the pestle rotates round the inside of the mortar, so as to crush the material between the pestle and mortar.

The method of supporting the sleeve $n$ on the ends of the studs $k$ allows the sleeve to oscillate in a plane at right angles to the axes of the studs, and as the support $f$ can oscillate in a plane at right angles to the axis of the spindle $g$ it will be obvious that the sleeve is supported as by a universal joint.

The pestle-stem can be pushed down farther through the sleeve or drawn up farther, so that the acting end of the pestle can rotate in different circles. As the pestle-stem can rotate freely within the sleeve, the pestle can roll on the side of the mortar; but it will be obvious that by gripping the pestle-stem so as to prevent the pestle rotating on its own axis while rotating about the axis of the mortar a sliding action can be obtained between the acting surfaces of the pestle and mortar.

By giving a reciprocating action to the stem of the pestle the latter may be used as a hammer to pound any material in the mortar.

It will be obvious that by raising the stem of the pestle and then giving it an angular movement the pestle can be withdrawn from the mortar. The mortar can then be removed from the base-plate.

The weight $s$ or the spring $t$ helps to force the pestle against the inside surface of the mortar and prevents the necessity of having to press hard with the hand on the pestle-handle. If desired, the weight can be arranged below the sleeve $n$, in which case it will increase the vertical force of the pestle on the mortar, but will decrease the horizontal force.

By means of my apparatus it will be obvious that I can obtain great pressure between the pestle and the mortar if the distance between the support and the handle be made sufficiently great. The mortar and the acting end of the pestle may be of any material now used, such as iron or porcelain ware.

I may use other forms of universal joint than that described for effecting the same purpose.

Having now described my invention, what I claim as new, and desire to secure by Letters Patent, is—

1. In combination, a mortar, a base-plate adapted to receive said mortar, a column rigidly attached to said base-plate, a bracket carried by said column, a block provided with a spindle which is adapted to rotate in a horizontal hole in said bracket, a sleeve pivoted to said block so as to be capable of oscillating about a horizontal axis perpendicular to the axis of the said spindle and a pestle provided with a stem adapted to rotate and to slide within said sleeve, substantially as described.

2. In combination, a mortar, a base-plate adapted to receive said mortar, a column rigidly attached to said base-plate, a bracket carried by said column, a block provided with a spindle which is adapted to rotate in a horizontal hole, in said bracket, studs screwed into said block at right angles to said spindle, a sleeve pivoted on said studs and a pestle provided with a stem adapted to rotate and to slide within said sleeve, substantially as described.

3. In combination, a pestle, a sleeve adapted to slidably and rotatably receive the stem of said pestle, a block to which the said sleeve is pivoted, a spindle extension on said block, a bracket in which said spindle extension can rotate, a mortar, and means for rigidly connecting the said mortar with the said bracket, substantially as described.

4. In combination, a pestle, a sleeve adapted to slidably and rotatably receive the stem of said pestle, a block to which the said sleeve is pivoted, a spindle extension on the said block, a bracket in which said spindle extension can rotate, a mortar, means for rigidly connecting the said mortar with the said bracket and means for increasing the pressure of the pestle on the inside of the mortar, substantially as described.

5. In combination, a pestle, a weight adjustably attached to the stem of said pestle, a sleeve adapted to slidably and rotatably receive the stem of said pestle, a block to which the said sleeve is pivoted, a spindle extension on said block, a bracket in which said spindle extension can rotate, a mortar and means for rigidly connecting the said mortar with the said bracket, substantially as described.

In witness whereof I have hereunto set my hand in presence of two witnesses.

THOMAS BREAKELL.

Witnesses:
ALBERT E. PARKER,
A. A. KRAUS.